(12) United States Patent
Garaviani

(10) Patent No.: US 11,174,835 B2
(45) Date of Patent: Nov. 16, 2021

(54) ROTOR UNIT OF A WIND TURBINE HAVING FOLDABLE WIND BLADES AND WIND TURBINE COMPRISING ROTOR UNIT

(71) Applicant: Omegawind S.r.l., Varese (IT)

(72) Inventor: Daniele Garaviani, Ferno (IT)

(73) Assignee: Omegawind S.r.l., Varese (IT)

( * ) Notice: Subject to any disclaimer, the term of this patent is extended or adjusted under 35 U.S.C. 154(b) by 546 days.

(21) Appl. No.: 16/097,105

(22) PCT Filed: Apr. 28, 2016

(86) PCT No.: PCT/IT2016/000106
§ 371 (c)(1),
(2) Date: Oct. 26, 2018

(87) PCT Pub. No.: WO2017/187460
PCT Pub. Date: Nov. 2, 2017

(65) Prior Publication Data
US 2021/0222670 A1    Jul. 22, 2021

(51) Int. Cl.
*F03D 1/06*    (2006.01)
*F03D 9/25*    (2016.01)
*F03D 7/04*    (2006.01)

(52) U.S. Cl.
CPC ......... *F03D 1/0675* (2013.01); *F03D 1/0658* (2013.01); *F03D 7/042* (2013.01); *F03D 9/25* (2016.05); *F05B 2240/30* (2013.01)

(58) Field of Classification Search
CPC ...... F03D 1/0675; F03D 1/0658; F03D 7/042; F03D 9/25; F05B 2240/30

USPC ......... 290/44, 55; 416/1, 9, 142, 147, 169 R
See application file for complete search history.

(56) References Cited

U.S. PATENT DOCUMENTS

| | | | | |
|---|---|---|---|---|
| 1,403,069 A | * | 1/1922 | Burne .................. | F03D 7/0224 416/132 R |
| 5,183,383 A | * | 2/1993 | Baas ....................... | F03D 7/02 416/9 |
| 5,226,805 A | * | 7/1993 | Proven ................. | F03D 7/0224 416/132 A |
| 5,354,175 A | * | 10/1994 | Coleman ............... | F03D 1/0658 416/9 |

(Continued)

FOREIGN PATENT DOCUMENTS

| | | |
|---|---|---|
| DE | 44 13 278 A1 | 10/1995 |
| JP | 2003-56448 | 2/2003 |

(Continued)

*Primary Examiner* — Charles Reid, Jr.
(74) *Attorney, Agent, or Firm* — Blank Rome LLP

(57) ABSTRACT

A rotor unit for a folding blade wind turbine. The turbine includes two blades rotatable with respect to each other between an open position and a folded position. In the open position, the two blades are arranged angularly spaced from each other in order to be able to be affected by the wind to rotate the rotor body. In the folded position, the two blades are arranged angularly close to each other so as to reduce the aerodynamic resistance of the wind turbine. The rotor unit is connectable to an electric generator to generate electric energy by the rotation of the rotor body when the blades are in the open position. The rotor unit includes two blade folding structures connected to the rotor body and pivotally connected to each other about a single hinge axis.

20 Claims, 16 Drawing Sheets

(56) References Cited

U.S. PATENT DOCUMENTS

| | | | |
|---|---|---|---|
| 8,299,645 B2 * | 10/2012 | Muchow | F03D 13/10 |
| | | | 290/55 |
| 2005/0200135 A1 * | 9/2005 | Shibata | F03D 7/0236 |
| | | | 290/55 |
| 2007/0243063 A1 | 10/2007 | Schellstede | |
| 2009/0022589 A1 | 1/2009 | Sorensen | |
| 2010/0133848 A1 | 6/2010 | Piasecki | |
| 2010/0140949 A1 * | 6/2010 | Pitre | F03D 13/20 |
| | | | 290/55 |
| 2012/0051912 A1 * | 3/2012 | Shi | F03D 1/0633 |
| | | | 416/132 B |

FOREIGN PATENT DOCUMENTS

| | | |
|---|---|---|
| JP | 2012-57484 | 3/2012 |
| WO | WO 2010/068780 A1 | 6/2010 |

\* cited by examiner

ROTOR UNIT OF A WIND TURBINE HAVING FOLDABLE WIND BLADES AND WIND TURBINE COMPRISING ROTOR UNIT

FIELD OF THE INVENTION

The present invention relates to the industrial field of wind turbines for generating electric energy, in particular wind turbines with folding blades for resisting strong winds. More specifically, the present invention relates to a rotor unit of such a wind turbine.

BACKGROUND ART

Wind turbines are devices for generating electric energy by exploiting the speed of the wind. They comprise a rotor which may rotate about a rotation axis, to which rotor blades are connected, which are generally arranged in a substantially radial direction with respect to the rotation axis and have a wing profile designed to bring the rotor into rotation when they are hit by the wind. An electric generator is connected to the rotor to receive a rotating motion from the rotor and to transform such a rotating motion into electric energy.

A known type of wind turbine is the one with horizontal axis, in which the rotation axis of the rotor is horizontal, or substantially horizontal.

Horizontal axis wind turbines are supported by a vertical tower adapted to carry the rotor and the electric generator.

The electric generator is generally associated with an inverter, a transformer, an electric circuitry and a control unit, in order to manage the electric energy generated and to command the turbine. These components are generally contained in a shell or nacelle, with respect to which the rotor is supported pivotally about a rotor axis.

The nacelle is generally supported in turn by the tower in a rotatable manner about a substantially vertical axis in order to orientate the rotor according to the direction of the wind.

The generation of electric energy supplied by the electric generator of the wind turbine depends on the rotation speed of the rotor and on the torque applied to the rotor by the blades, therefore the tendency is to use large blades and to install wind turbines in areas which, on average, are windy, for example in plains or on off-shore platforms in the sea or in a lake.

A typical trend of the power supplied by the electric generator of the wind turbine as a function of the wind speed is depicted in the graph in FIG. 22, wherein the wind speed may be exploited in a speed range between a minimum exploitable wind speed value V1 and a maximum exploitable wind speed value V2. When wind speeds exceed V2, electric energy may not be generated due to physical and structural limitations both of the wind turbine and of the devices for generating electric energy.

With reference to the wind speed range between V1 and V2, in a first section of such a speed range of the exploitable wind, the power supplied increases with the wind speed from a minimum power value $P_{min}$ to a maximum power value $P_{max}$. In a second section of such a wind speed range, the power supplied remains constant at a value $P_{max}$ due to physical limitations of the devices for generating electric energy and to structural limitations.

When the wind exceeds the maximum exploitable wind speed value V2, and therefore takes on a speed value ranging between V2 and a maximum wind speed value $V_{max}$, the rotor is substantially stopped, thus limiting the angular rotation in order to limit the aerodynamic loads exerted by the wind on the wind turbine. The wind turbine is therefore stopped between the maximum exploitable wind speed value V2 and the maximum wind speed $V_{max}$, in order to resist a storm and not generate electric energy. The mechanical stresses exerted by the wind on the turbine under such conditions are extremely high.

In order to resist such extreme stresses, known wind turbines intended for such a use should be designed to have a very sturdy turbine structure, which is particularly demanding in terms of design and construction and is therefore particularly expensive.

In an attempt to overcome the aforesaid problem, folding blade wind turbines have been designed in order to fold such blades in a standby mode when the wind is greater than V2.

In this regard, Patent Application US 2010/0133848 discloses a horizontal axis wind turbine comprising a beam hub and two blades hinged to the two opposite ends of the beam hub at hinge points spaced apart from each other in order to fold such blades towards the tower.

The two blades are therefore restrained to be folded about two distinct and separate folding axes.

This solution results in the disadvantage that the presence of the beam hub prevents reducing the wind turbine surface resistant to the action of the wind, in addition to the limitation given by the length of the beam hub between the two hinge points, also when the blades are folded. Indeed, the beam hub continues to oppose significant aerodynamic resistance since it protrudes laterally by a considerable length with respect to the tower, also when the blades are closed. Moreover, the folded portions of the blades are hinged at points which are far from the rotor and, therefore, they also oppose high resistance to the wind.

Such a wind turbine is not capable of resisting high wind speed values; or, in order to resist, it should comprise an extremely rigid and resistant, and accordingly expensive, structure.

Patent Application US 2007/0243063 discloses a folding blade wind turbine which proposes to minimize damage during storms or other events with strong winds and to facilitate maintenance.

This wind turbine comprises three blades, two of which foldable about separate hinge points arranged at the free ends of respective blade bases fastened radially to the rotor.

For the same reasons noted above, this wind turbine also hinders the encumbrance, or the resistant surface, from being reduced when the blades are closed, to such a degree as to resist high values or peaks in wind speed, because such blades remain spaced apart from the tower at least at the hinge points of the blade bases.

Therefore, even this solution does not satisfy the needs to provide a wind turbine capable of resisting high values or peaks in the wind speed, thus avoiding to make an extremely sturdy and expensive structure.

Therefore, the need is felt to close the blades of the wind turbine when the maximum exploitable wind speed V2 is reached in order to avoid damaging any components of the wind turbine during this closing step, so that when the blades are folded, they significantly reduce the encumbrance of the turbine transversally to the direction of the wind, by being arranged very closely and adhering to the tower.

For wind speed values ranging between the maximum exploitable wind speed value V2 and the maximum wind speed value $V_{max}$, the wind turbine should also ensure correct and safe maintenance of the blades in the folded position, while opposing the minimum aerodynamic resistance also in such a folded position.

In particular, none of the known solutions allows the blades to be closed in such a way as to substantially reduce the aerodynamic resistance during such a closing step, in a quick and accurate manner.

Moreover, none of the known solutions allows the blades to be positioned in a folded position capable of ensuring the minimum aerodynamic resistance in the folded position and the correct maintenance of such a position despite the criticality of the environmental conditions.

SUMMARY OF THE INVENTION

It is an object of the present invention to devise and provide a rotor unit for a wind turbine which allows the aforesaid needs to be met while at least partly obviating the drawbacks indicated above with reference to the known art.

In particular, it is a task of the present invention to provide a rotor unit for a folding blade wind turbine, which is capable of significantly reducing the encumbrance and the aerodynamic resistance when the blades are closed.

It is therefore an object of the present invention to supply a rotor unit for a folding blade wind turbine, which is capable of allowing such a wind turbine to resist high wind speed values and at the same time simultaneous and sudden variations in wind speed while avoiding a particularly sturdy structure to be required.

It is another object of the present invention to provide a rotor unit for a folding blade wind turbine, which is simple and affordable to manufacture.

It is another object of the present invention to provide a wind turbine which has the aforesaid advantages.

It is another object of the present invention to provide a rotor unit and a wind turbine capable of providing an intrinsically safe solution and of requiring a minimum energy source to complete the folding procedure and consequent implementation of safety measures of the blades.

It is another object of the present invention to facilitate blade maintenance and inspection activities.

It is another object of the present invention to reduce by about 60% the resulting bending moment at the base of the wind turbine tower due to the aerodynamic action of the winds acting on the blades, the tower and the nacelle with respect to known wind turbines.

These and further objects and advantages are achieved by means of a rotor unit for a folding blade wind turbine and by means of a wind turbine comprising such a rotor unit in accordance with the independent claims.

Further objects, solutions and advantages are found in the embodiments hereinafter described and claimed in the dependent claims.

BRIEF DESCRIPTION OF THE DRAWINGS

The invention will be disclosed below with the description of certain embodiments thereof, made by way of a non-limiting example, with reference to the accompanying drawings in which.

DESCRIPTION OF PREFERRED EMBODIMENTS

Figure 1:
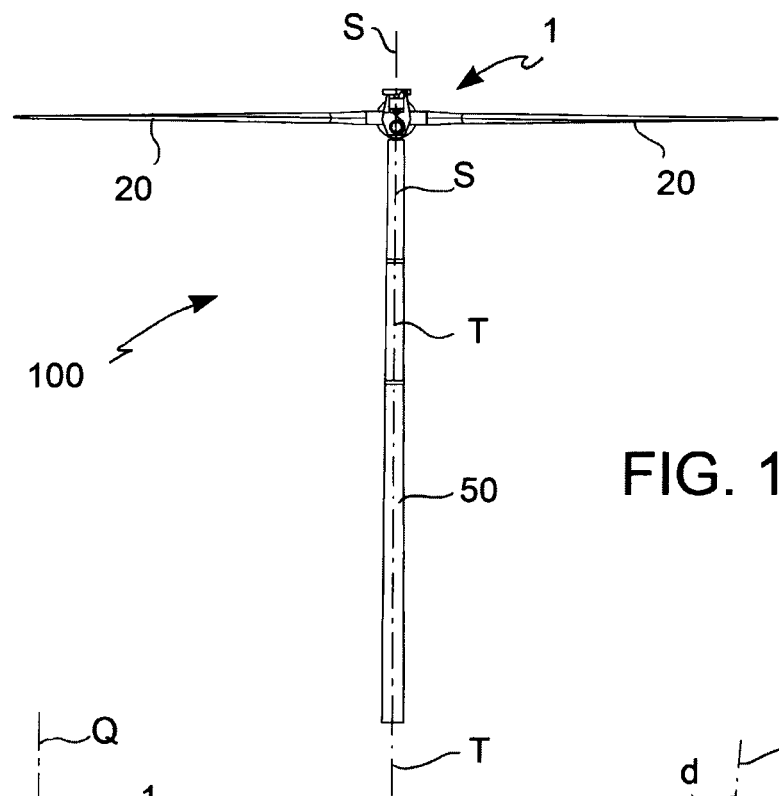
FIGS. 1, 2, 3 show a front view, a side view and a top view, respectively, of a wind turbine according to the invention, with blades in an open position.
Figure 2:
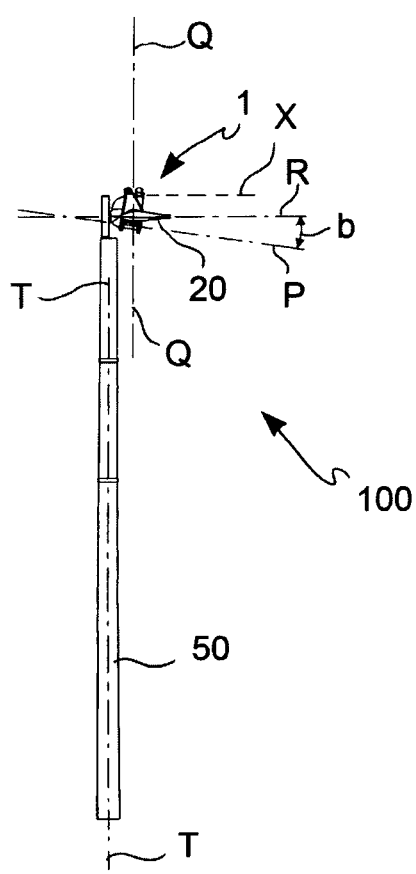
Figure 3:
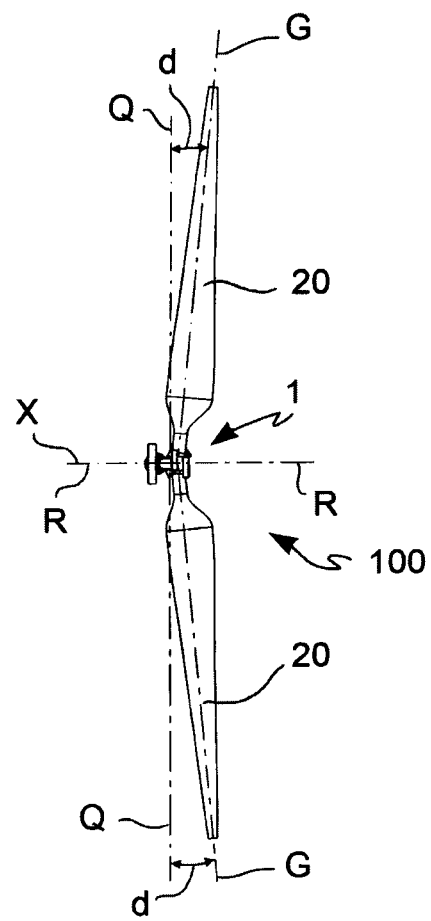
Figure 4:
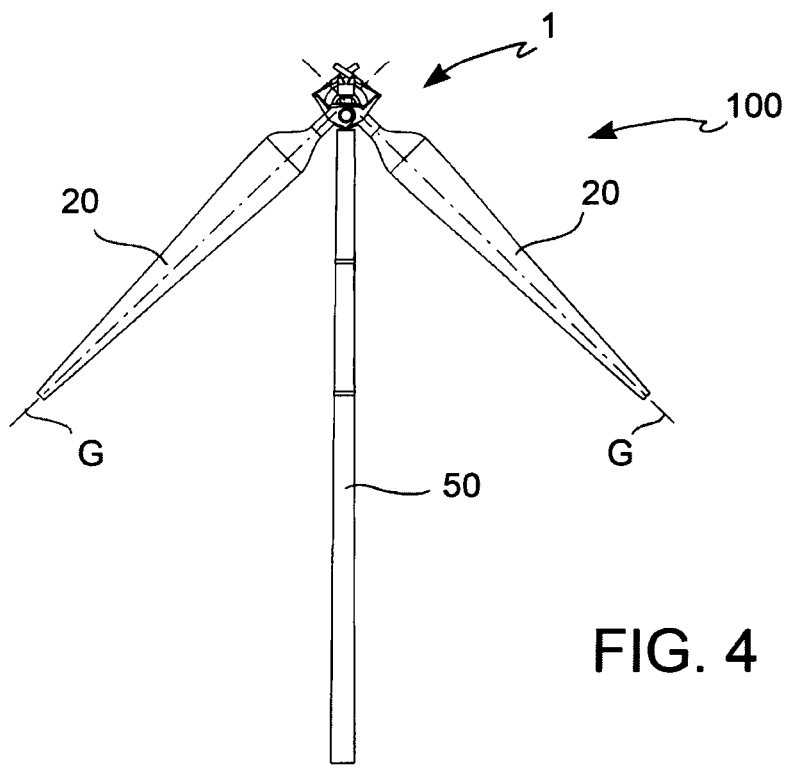
FIGS. 4, 5, 6 show a front view, a side view and a top view, respectively, of the wind turbine in FIG. 1, wherein the blades are in an intermediate position between the open position and the folded position.
Figure 5:
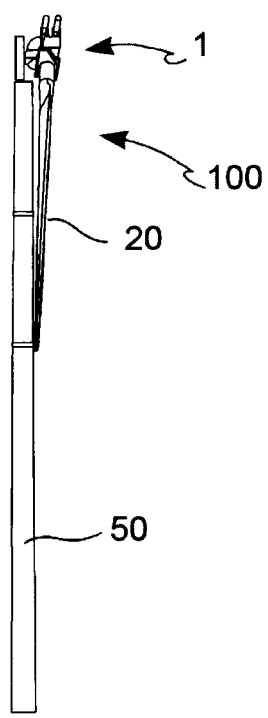
Figure 6:
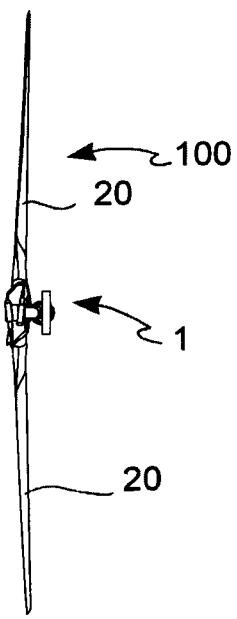
Figure 7:
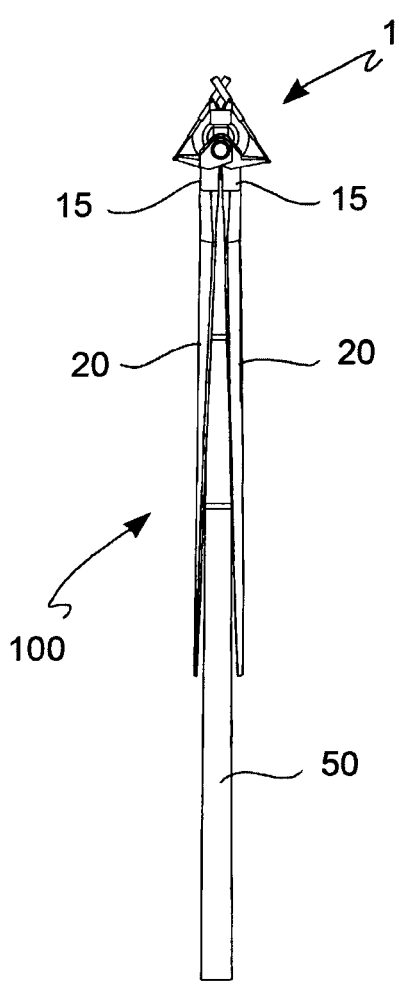
FIGS. 7, 8, 9 show a front view, a side view and a top view, respectively, of the wind turbine in FIG. 1, in which the blades are in a folded position.
Figure 8:
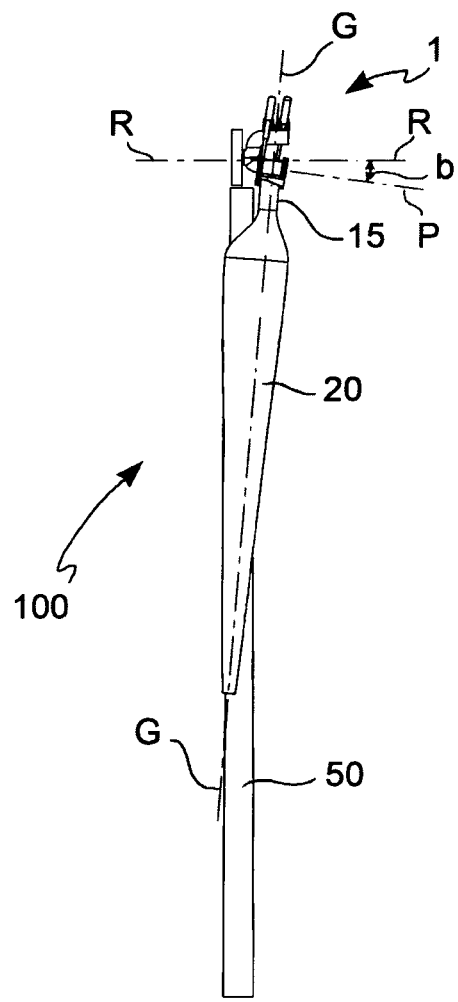
Figure 9:
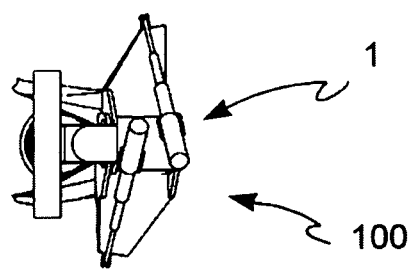
Figure 10:
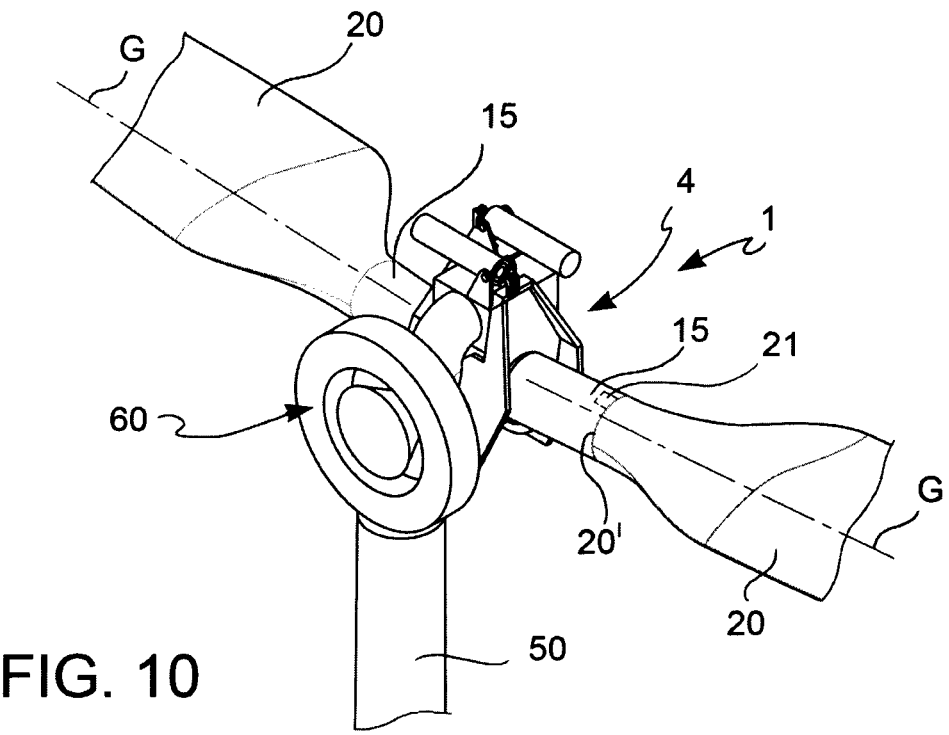
FIG. 10 shows a rear perspective view, or a front perspective view, depending on whether the blades are upwind or downwind of the supporting tower, of a rotor unit according to the invention, in which the blades are in the open position.
Figure 11:
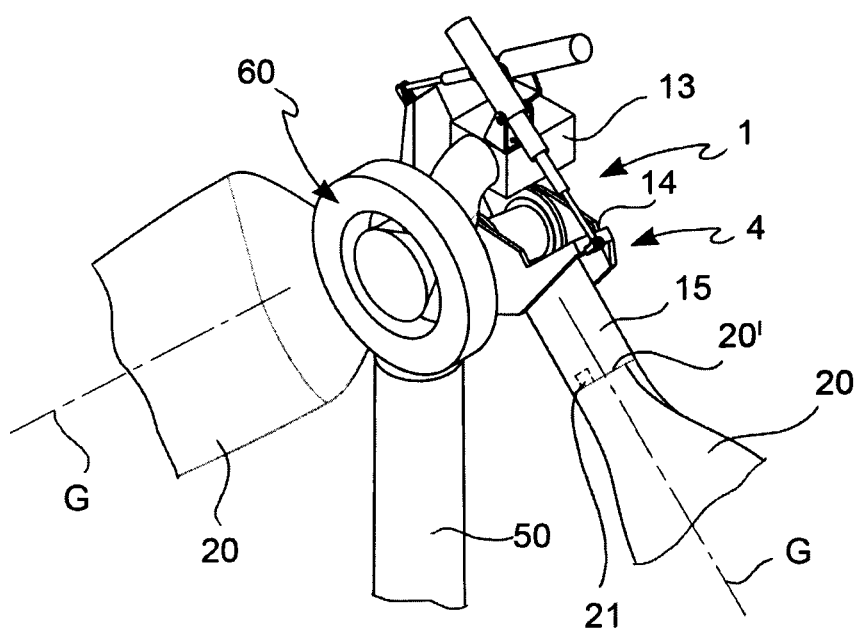
FIG. 11 shows a rear perspective view of the rotor unit in FIG. 10, in which the blades are in an intermediate position between an open position and a folded position.
Figure 12:
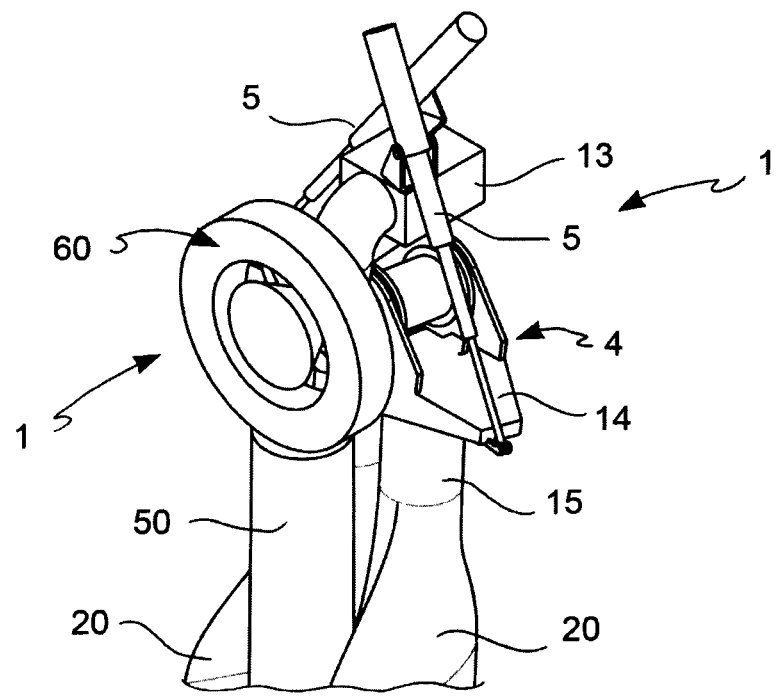
FIG. 12 shows a rear perspective view of the rotor unit in FIG. 10, in which the blades are in a folded position.
Figure 13:
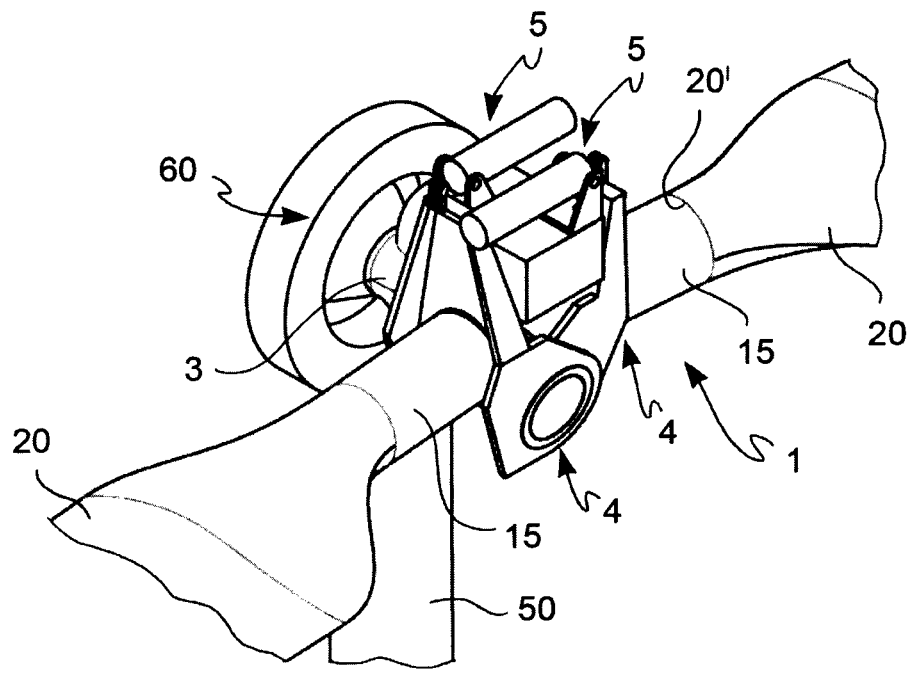
FIG. 13 shows a front perspective view of the rotor unit in FIG. 10, in which the blades are in an open position.
Figure 14:
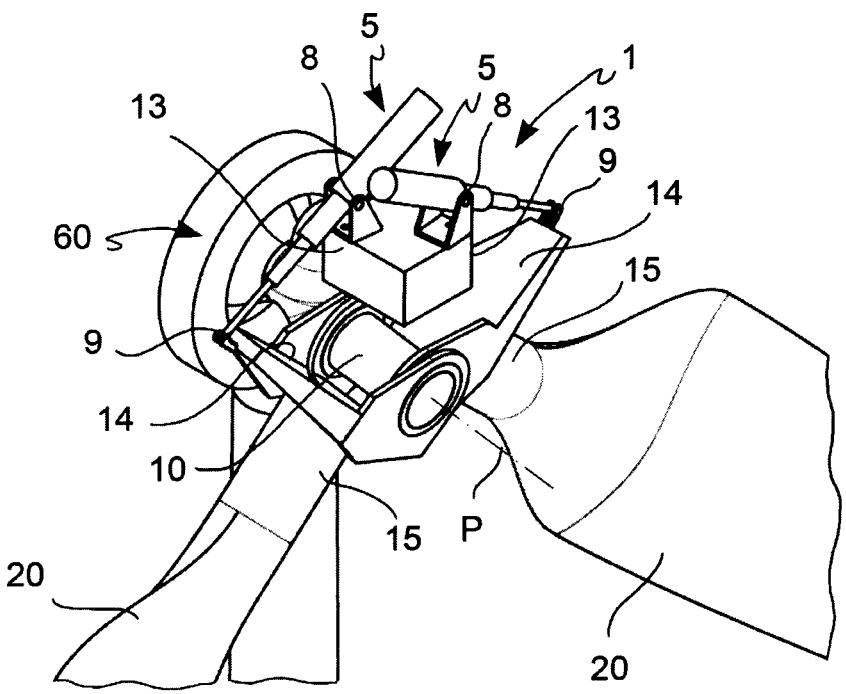
FIG. 14 shows a front perspective view of the rotor unit in FIG. 10, in which the blades are in an intermediate position between an open position and a folded position.
Figure 15:
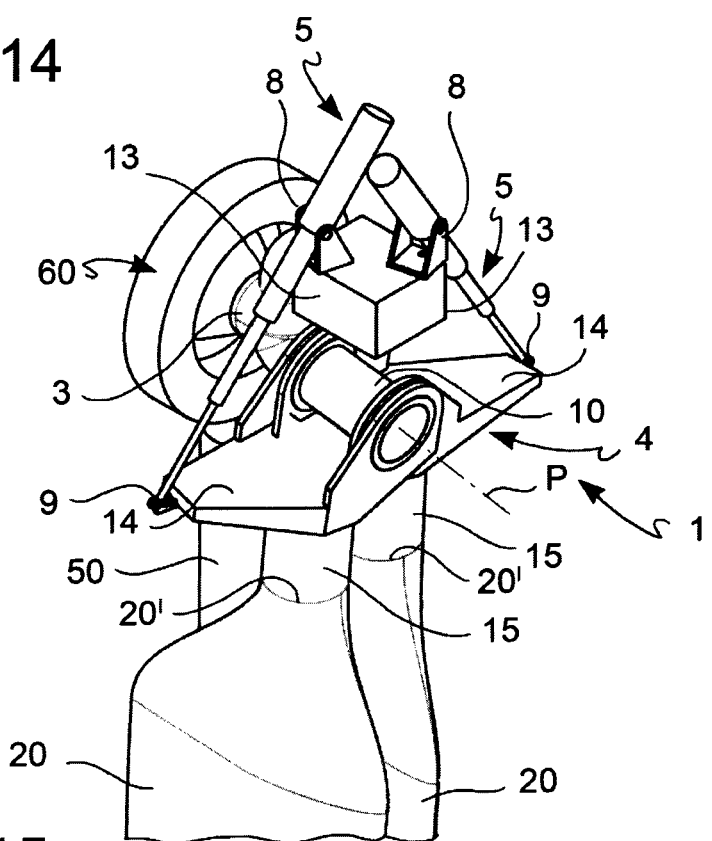
FIG. 15 shows a front perspective view of the rotor unit in FIG. 10, in which the blades are in a folded position.

Hereinafter, the term "axial plane" will indicate a plane passing through the rotor axis R, i.e. containing the rotor axis R. The rotor axis R is the rotation axis of the rotor when the wind turbine is actuated by the wind.

Moreover, the term "radial plane" will indicate a plane which is orthogonal to the rotor axis R. Therefore, a radial plane and an axial plane are orthogonal to each other.

Moreover, "radial direction" will indicate a direction which is orthogonal to the rotor axis R.

With reference to the figures, a rotor unit according to the invention is generally indicated with numeral 1. Moreover, again with reference to the figures, a folding blade wind turbine according to the invention is generally indicated with numeral 100.

The wind turbine 100 comprises the rotor unit 1, a tower 50 adapted to support the rotor unit 1, for example pivotally about or parallel to a tower axis T; an electric generator 60 connected to the rotor unit 1 to receive a rotating motion from the rotor unit 1, at least two blades 20 connected to the rotor unit 1.

The rotor unit 1 of wind turbine comprises a rotor body 2 arranged to rotate about a rotor axis R. The rotor body 2 has an output of rotating motion 3 adapted to be operatively connected to an electric generator 60 to transfer a rotating motion from said rotor body 2 to said electric generator 60.

The at least two blades 20 are rotatable with respect to each other between an open or operative position and a folded or standby position, wherein, in said open position, said at least two blades 20 are arranged angularly spaced from each other about the rotor axis R in order to be able to be affected by the wind to bring said rotor body 2 into rotation about said rotor axis R, and in which, in said folded position, said at least two blades 20 are arranged angularly close to each other with respect to the rotor axis R so as to reduce the aerodynamic resistance of the wind turbine.

The rotor unit 1 comprises at least two blade folding structures 4 connected to the rotor body 2 and each comprising a blade fastening portion 17 for fastening an end portion of a respective blade 20 of said at least two blades 20 to each of said at least two blade folding structures 4.

According to one embodiment, each blade is connected to a respective blade folding structure 4 of the rotor unit 1 in order to rotate together with said blade folding structure 4 about said hinge axis P.

The rotor unit 1 further comprises at least one actuator 5 arranged to move said at least two blade folding structures 4 with respect to each other.

The at least two blade folding structures 4 are pivotally connected to each other about a same hinge axis P.

Thereby, the blade folding structures 4 are adapted to rotate the at least two blades 20 about the hinge axis P between the open position and the folded position and vice versa.

Advantageously, due to the fact that the at least two blade folding structures 4 are pivotally engaged to each other about a same hinge axis P, the wind turbine occupies an extremely reduced volume in all directions of the wind when the blades 20 are in the folded position. Due to the presence of only one hinge axis P, the blades in the folded position are very close to each other and they may embrace tower 50 laterally. In this regard, see for example FIGS. 19, 7, 8, 27, 28.

Under these conditions, since such a wind turbine 100 has a very small encumbrance in the direction transverse to the wind when the blades 20 are in the folded position, i.e. the resultant of the forces applied by the wind to the structure of the wind turbine, according to the present invention, is less than the one applied to known wind turbines, a less sturdy structure with respect to known turbines is required, the wind speed being equal.

This results in a lighter wind turbine 100 structure, with lower manufacturing and operating costs.

Each of said at least two blade folding structures 4 supports only one blade 20.

In accordance with an embodiment, in the open position, the blades 20 are angularly equally spaced from one another about the rotor axis R.

In accordance with an embodiment, in the open position, the blades 20 are equally spaced from one another along a conical surface.

Blade longitudinal axis G means an axis along which the larger dimension of blade 20 itself is arranged. In other words, the blade longitudinal axis G is a main axis of extension of blade 20.

In accordance with an embodiment, the blade longitudinal axis G is, for example, a substantially rectilinear axis, as shown in FIGS. 3, 4, 8, 27, 28, for example.

In accordance with an embodiment, when the blades 20 are in the open position, the blade longitudinal axis G is tilted with respect to a radial plane Q orthogonal to the rotor axis R, according to a preset angle d. In this regard, see FIGS. 3, 18 and 24.

In accordance with an embodiment, the hinge axis P and the rotor axis R define a common rotor axial plane L comprising the hinge axis P and the rotor axis R. In this regard, see the example in FIG. 16.

Figure 20:
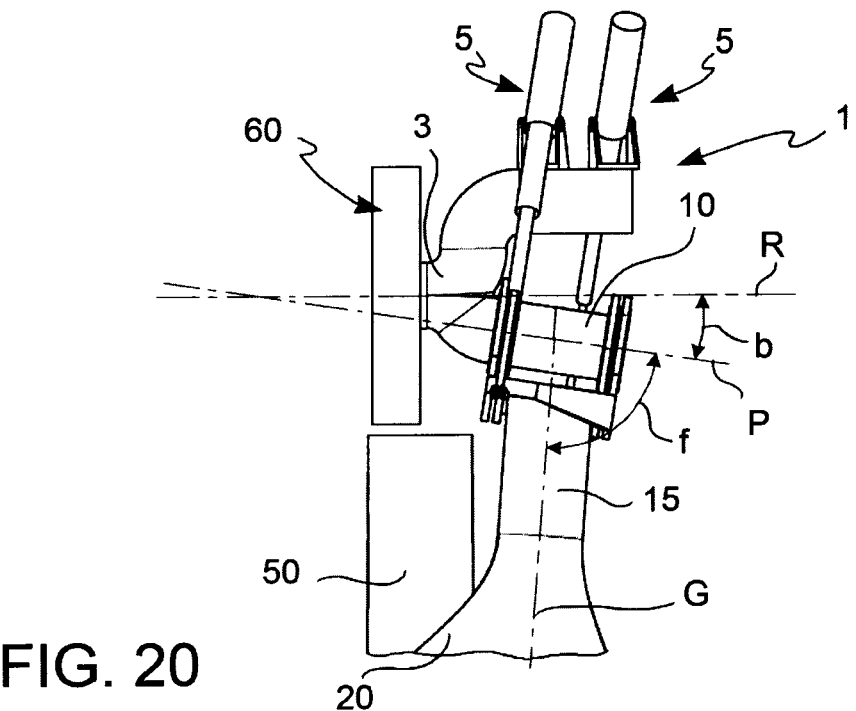
FIG. 20 shows a side view of the rotor unit in FIG. 16, in which the blades are in a folded position.
Figure 21:
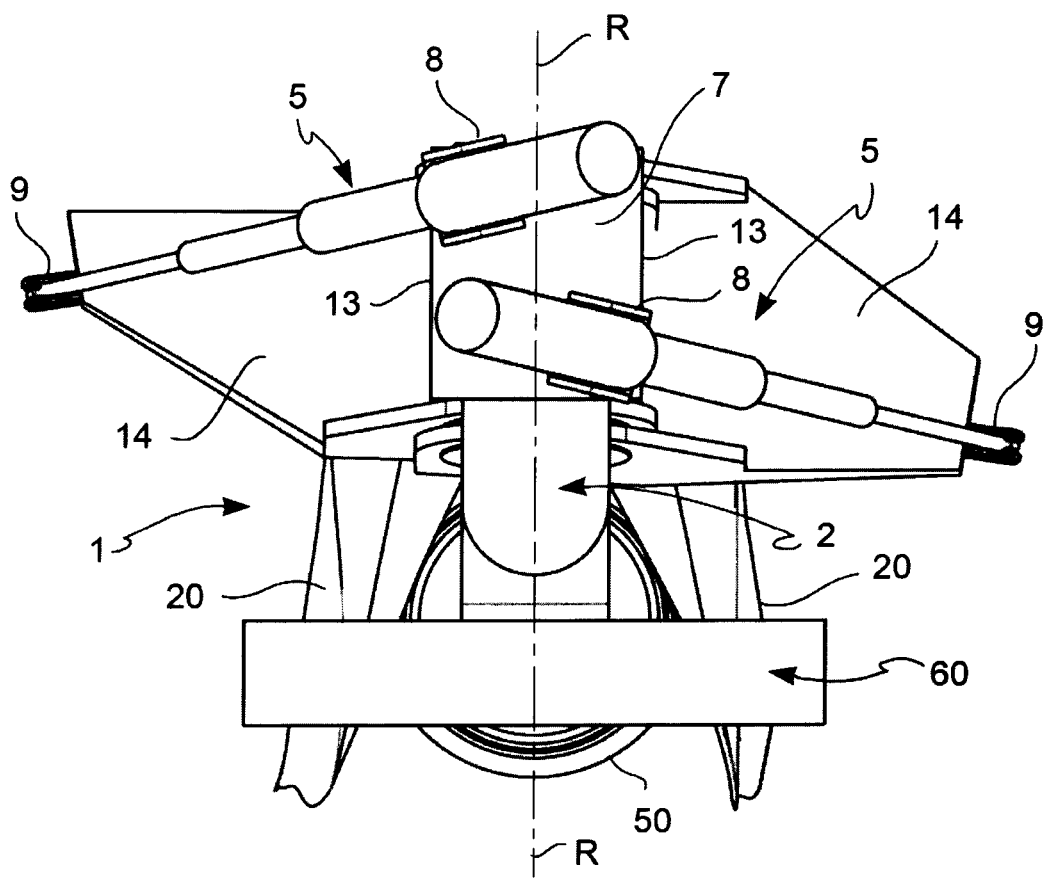
FIG. 21 shows a top view of the rotor unit in FIG. 16, in which the blades are in a folded position.
Figure 22:
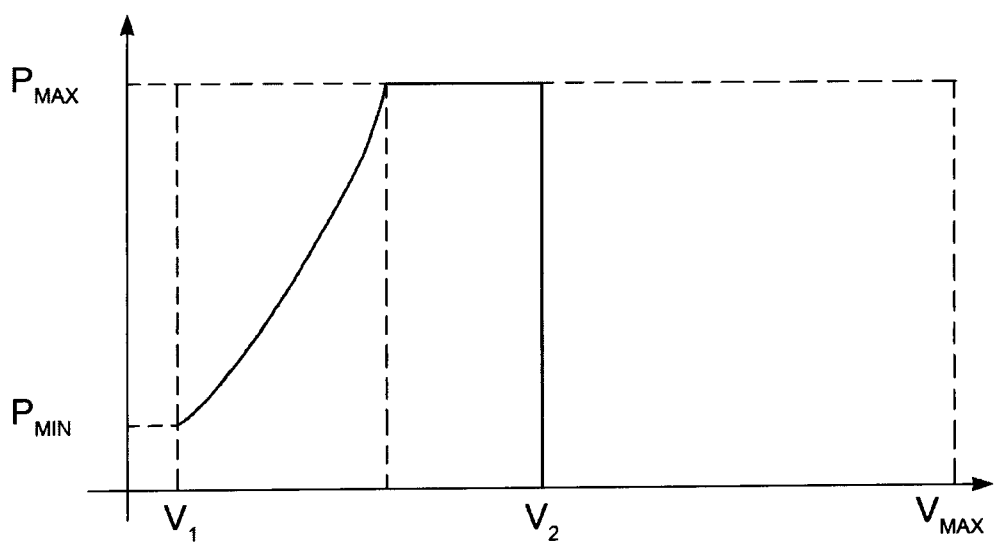
FIG. 22 shows a graph of the trend of the power supplied by the wind turbine as a function of the wind speed.
Figure 23:
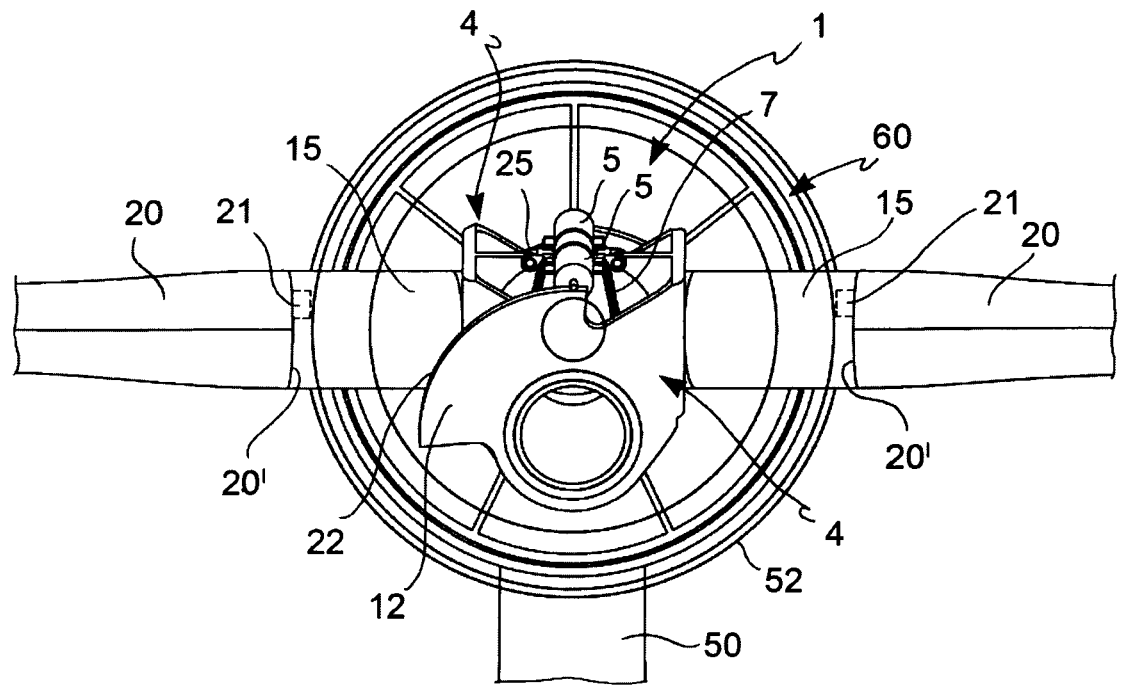
FIG. 23 shows a partial front view of a wind turbine having a rotor unit according to a second embodiment of the invention, in which the turbine is in the open position.
Figure 31:
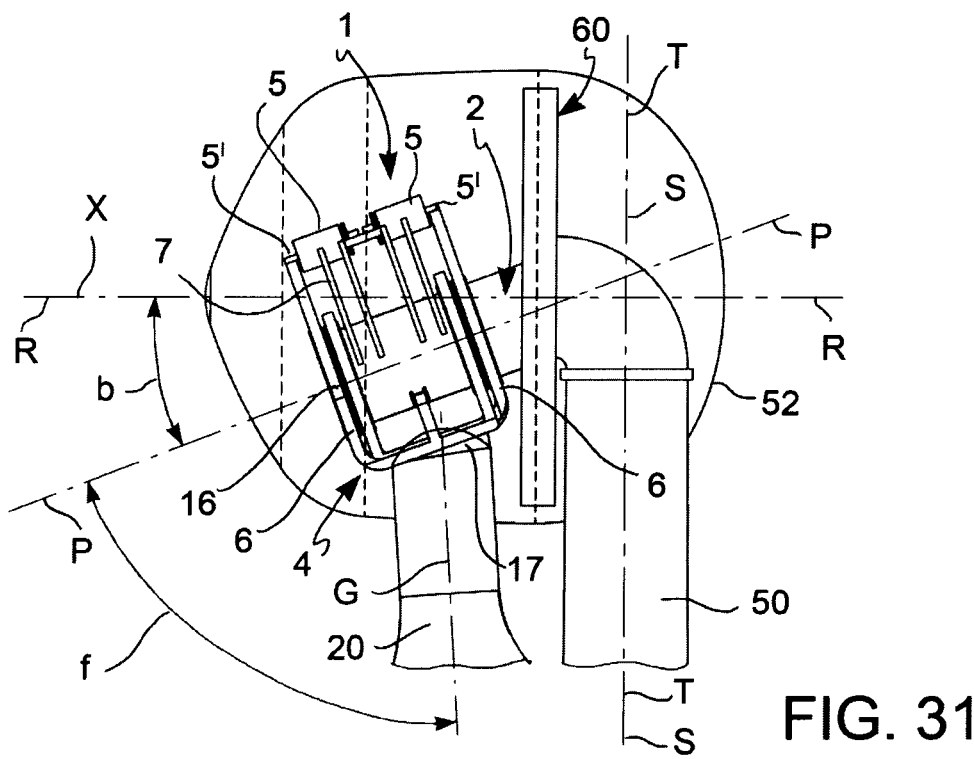
FIG. 31 shows a partial side view of the turbine in FIG. 27.
Figure 32:
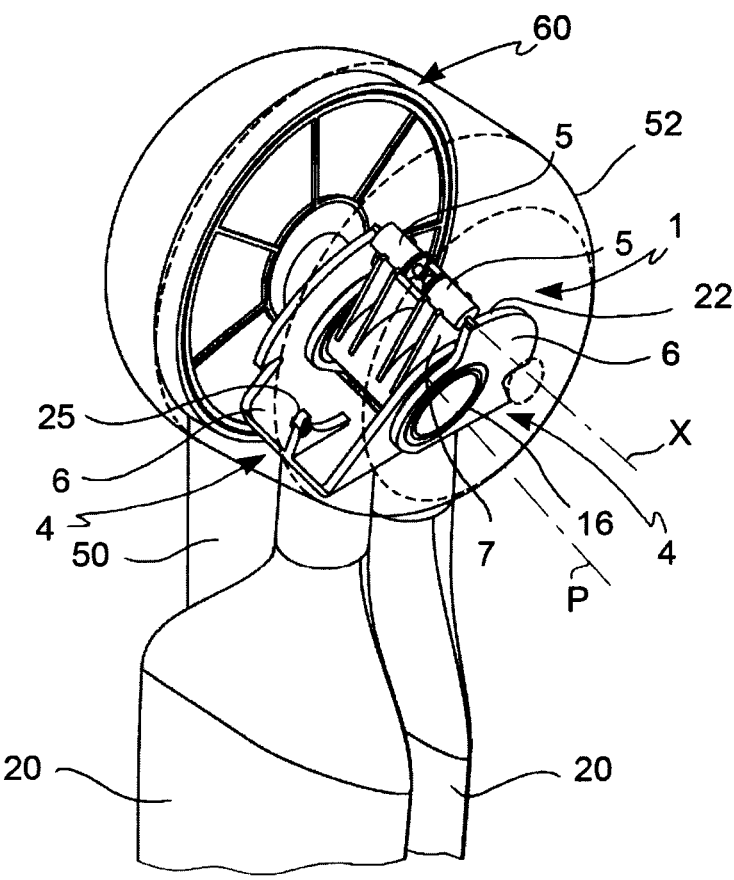
FIG. 32 shows a partial perspective view of the turbine in FIG. 27.
Figure 33:
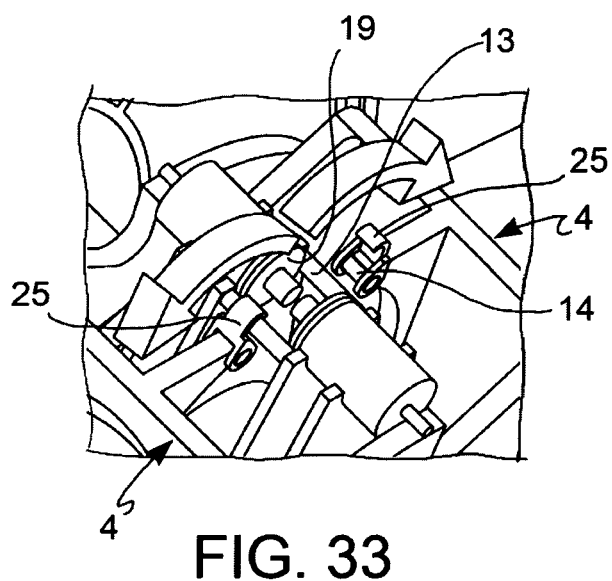
FIGS. 33 and 34 show a detail of blocking/releasing devices of the blade folding structures, in the open position with the blades open and in open position with the blades closed, respectively.
Figure 34:
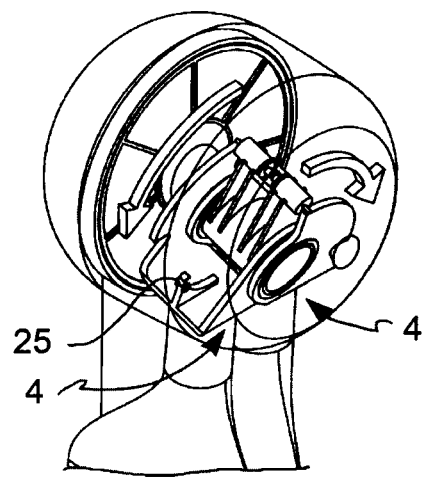
Figure 35:
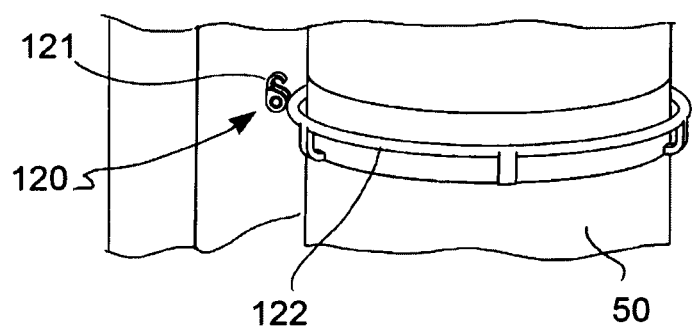
FIG. 35 shows a detail of the wind turbine in which blade stopping devices are depicted in the open position to retain the blades which are close to the tower.
Figure 36:
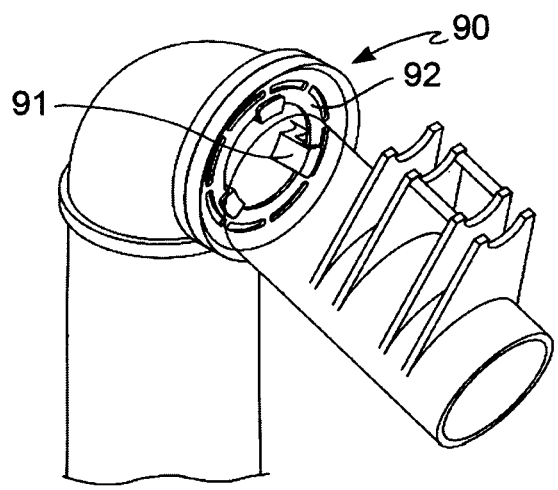
FIG. 36 shows a detail of the rotor brake of the wind turbine in which pincer bodies and brake disc are depicted.

In accordance with an embodiment, when the blades 20 are in the folded position, the projection of the blade longitudinal axis G on the rotor axial plane L forms a preset blade angle f with respect to the hinge axis P. In this regard, see FIGS. 20 and 31.

In accordance with an embodiment, the hinge axis P and the rotor axis R define a common rotor axial plane L-L comprising the hinge axis P and the rotor axis R. In this regard, see the example in FIG. 16.

In accordance with an embodiment, when the blades 20 are in the folded position, the projection of the blade longitudinal axis G on the rotor axial plane L-L forms a preset blade angle f with respect to the hinge axis P. In this regard, see FIGS. 20 and 31.

In accordance with an embodiment, the blade angle f ranges between 68° and 88°, preferably between 74° and 78°, and more preferably the blade angle f is about 72°.

In accordance with an embodiment, the hinge axis P is tilted with respect to the rotor axis R according to a preset tilt angle b. In this regard, see FIGS. 20 and 31.

For example, the tilt angle b ranges between 1° and 40°, preferably ranges between 5° and 20°, and still more preferably between 8° and 12°.

For example, the tilt angle b is selected so that, when the blade folding structures 4, or the blades 20, are in the folded position, the blades 20 are placed side-by-side with the tower 50 in a tilted manner with respect to the tower axis T, according to a preset closed angle with respect to the rotor axis R. Such a preset closed angle is equal to the sum of the tilt angle b and of the blade angle f.

In other words, when the blade folding structures 4, or the blades 20, are in the folded position, the blade longitudinal axis G forms a preset closed angle with the rotor axis R, which preset closed angle is equal to the sum of the tilt angle b and the blade angle f.

Figure 24:
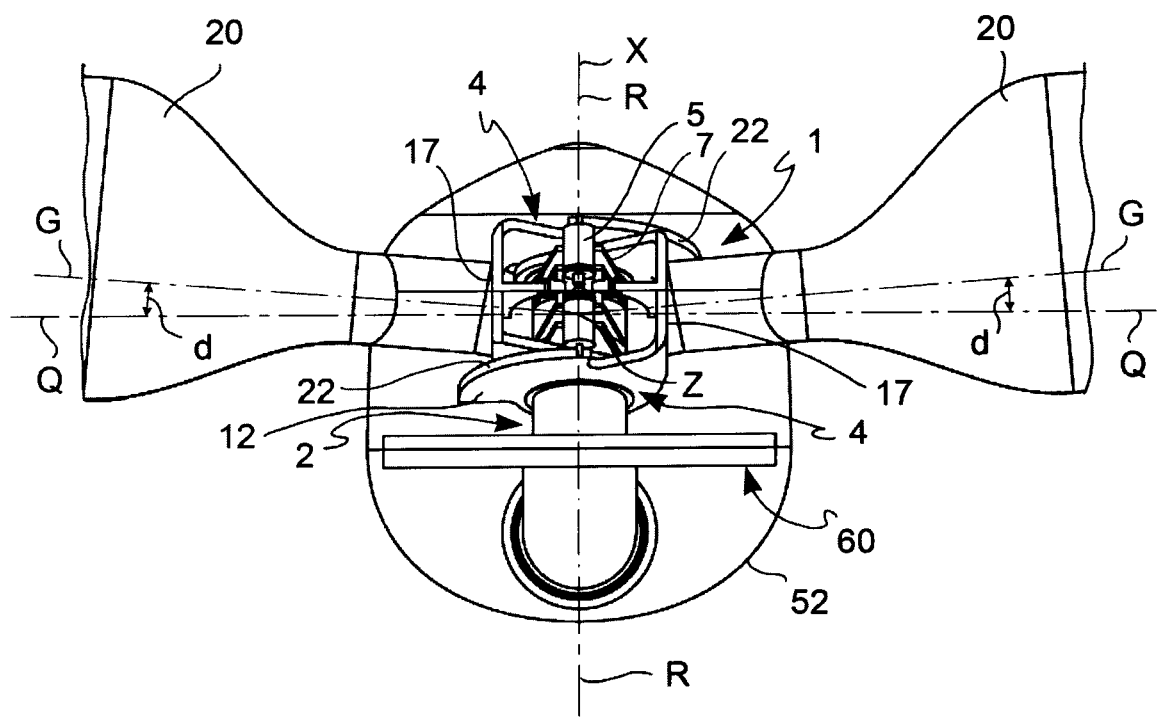
FIG. 24 shows a partial top view of the turbine in FIG. 23.
Figure 25:
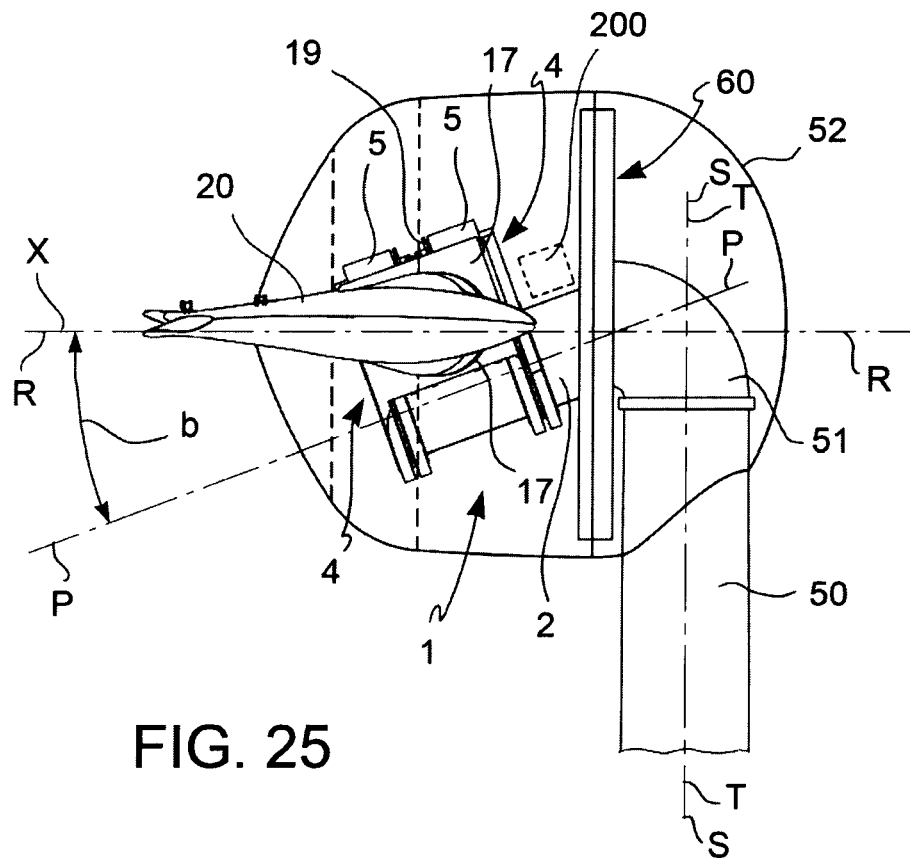
FIG. 25 shows a partial side view of the turbine in FIG. 23.
Figure 26:
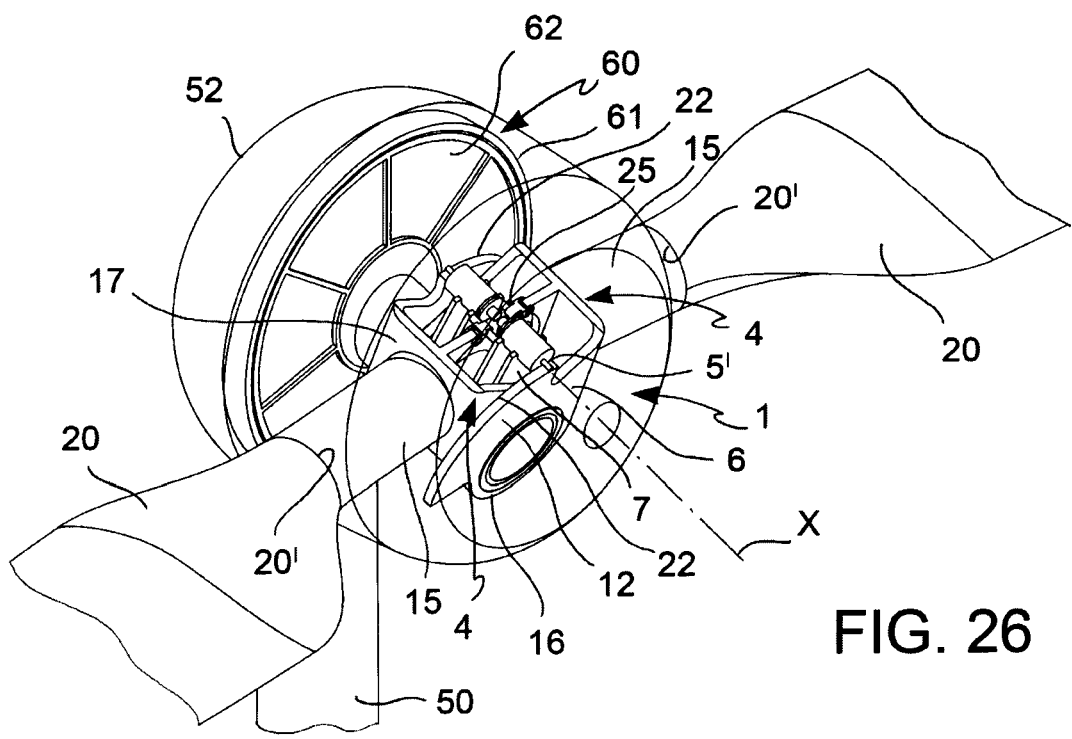
FIG. 26 shows a partial front perspective view of the turbine in FIG. 23.
Figure 27:
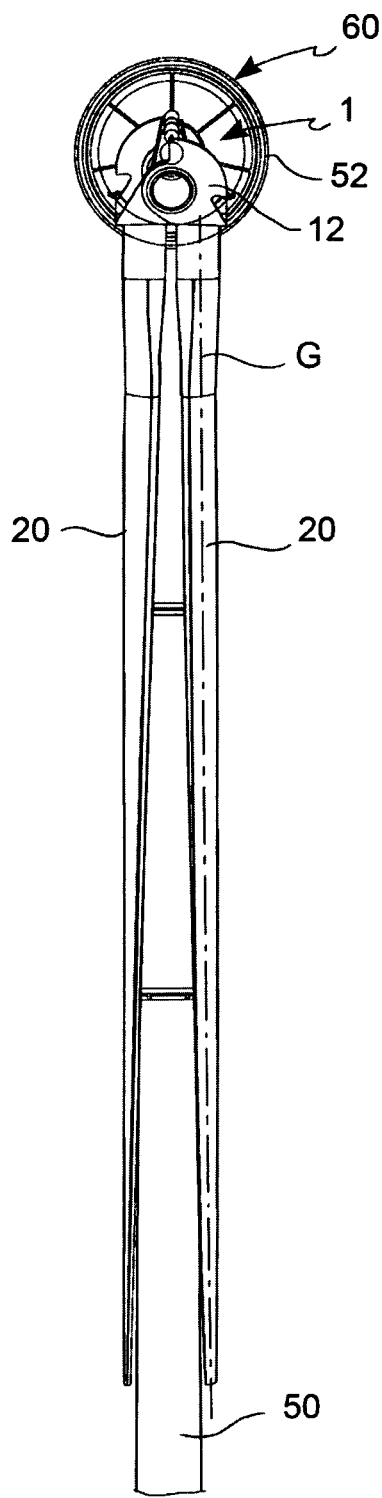
FIGS. 27 and 28 show a front view and a rear perspective view, respectively, of a wind turbine having the rotor unit in FIG. 23, in which the blades of the turbine are in the folded position.
Figure 28:
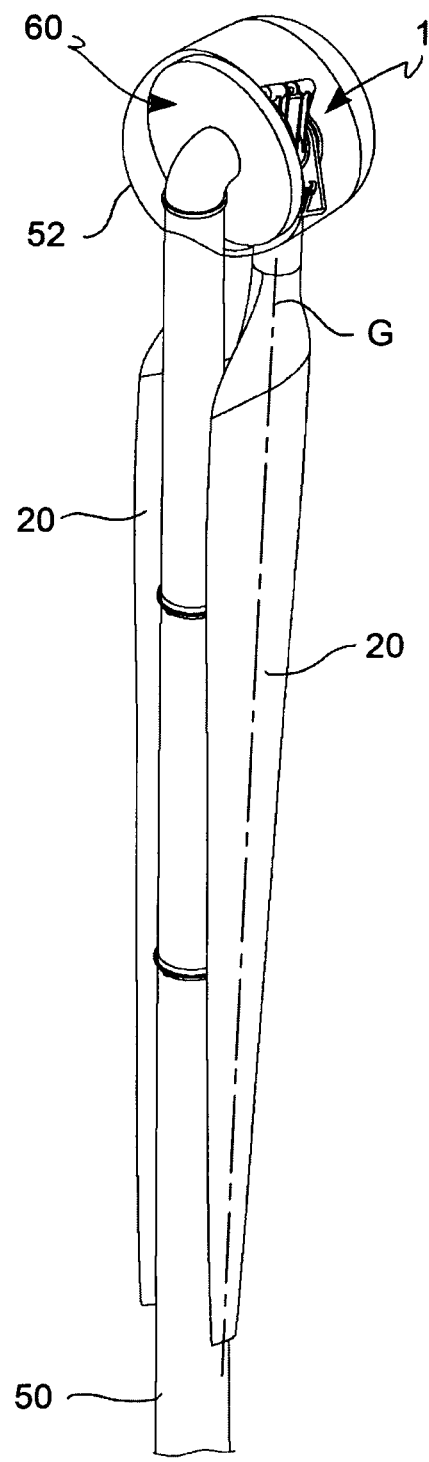
Figure 29:
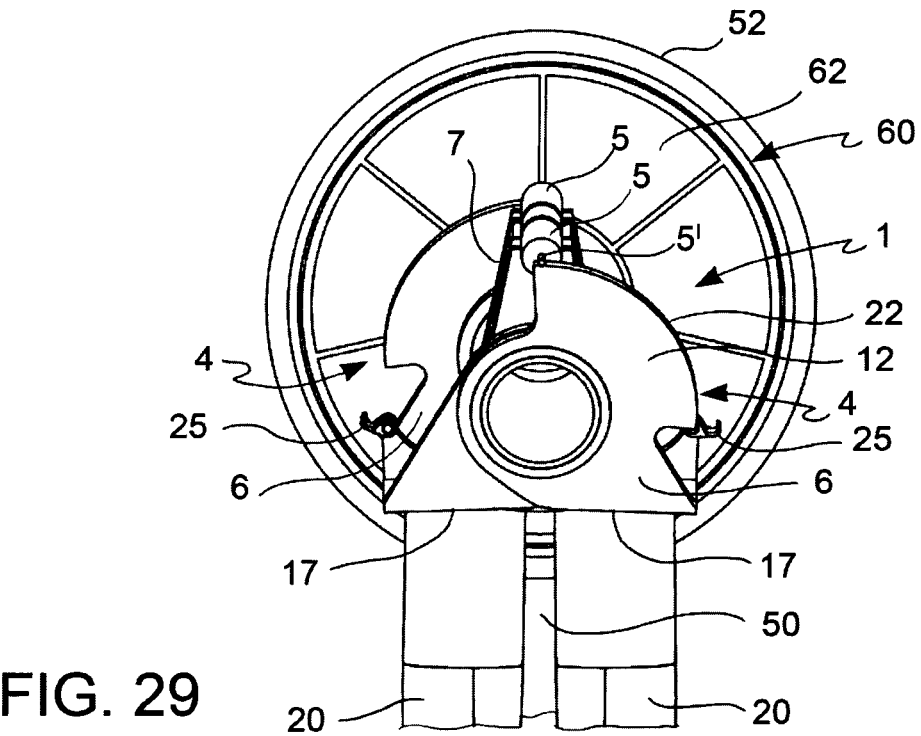
FIG. 29 shows a partial front view of the turbine in FIG. 27.
Figure 30:
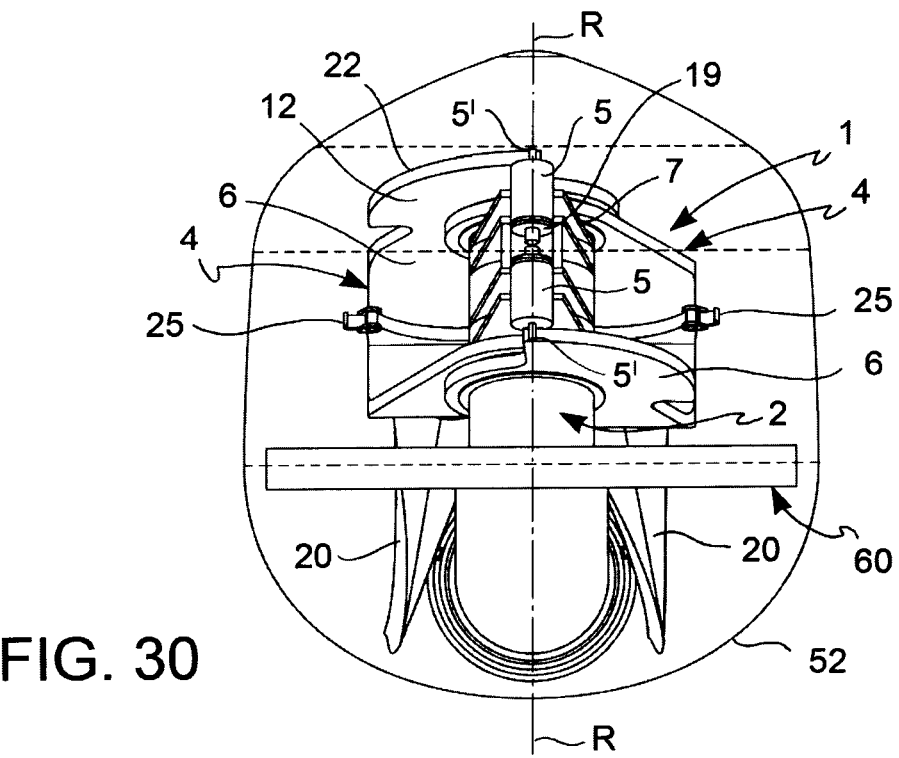
FIG. 30 shows a partial top view of the turbine in FIG. 27.

In accordance with an embodiment, when the blades 20 are in the open position, the blade longitudinal axes G of the blades 20 intersect the rotor axis R at a same point Z, as shown for example, in FIG. 24.

In accordance with an embodiment, each of said at least two blade folding structures 4 comprises a hinging portion 16 which is pivotally engaged with the rotor body 2 about the hinge axis P, the aforesaid blade fastening portion 17 for connecting the free end of blade 20 to the supporting bracket 6, an actuation portion 12 on which said at least one actuator 5 acts.

The actuation portion 12 is arranged at a preset distance from the hinging portion 16 to receive a force and an actuation motion from said at least one actuator 5.

Figure 16:
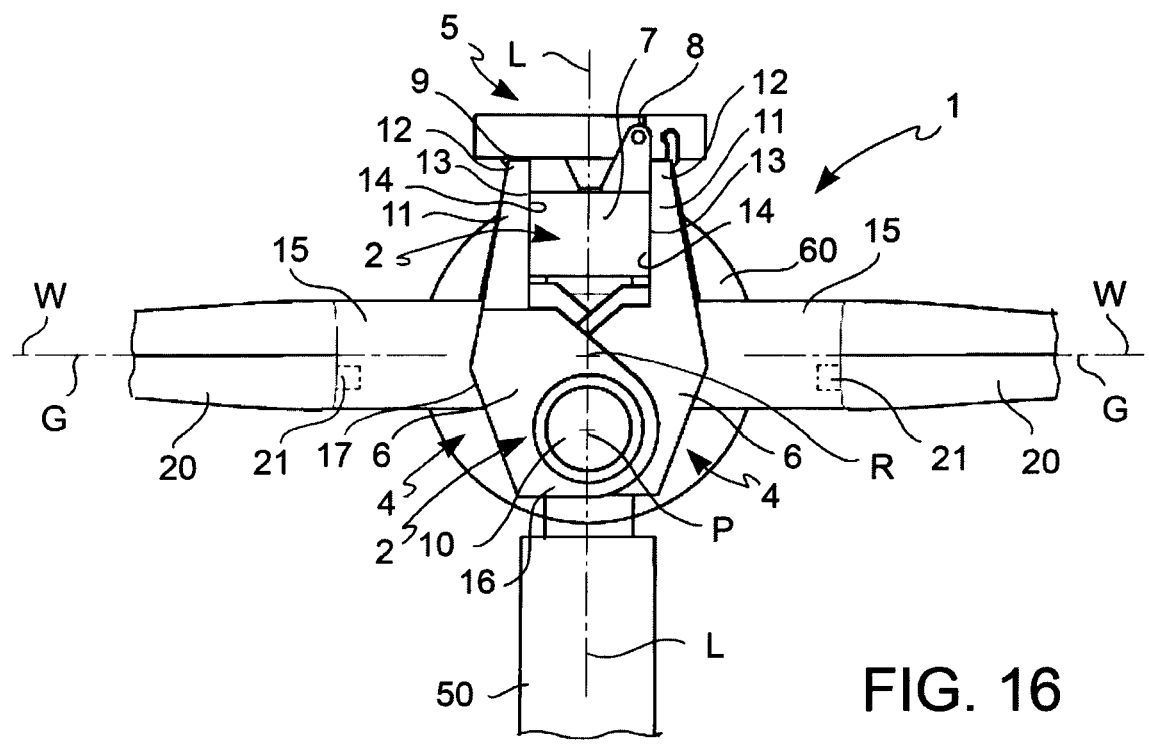
FIG. 16 shows a front view of the rotor unit in FIG. 10, in which the blades are in an open position.

In accordance with an embodiment, as for example shown in FIG. 16, the blade fastening portion 17 is interposed between the hinging portion 16 and the actuation portion 12, for example, the hinging portion 16 and the actuation portion 12 are arranged at two opposite ends of the supporting bracket 6.

In other words, according to this embodiment, the supporting bracket 6 is a second-class lever.

In accordance with an embodiment, the rotor body 2 comprises a pin portion 10 which extends along said hinge axis P, and said hinging portion 16 of said supporting bracket 6 comprises a seat for pivotally receiving said pin portion 10. In other words, the seat for pivotally receiving the pin portion 10 forms a rotoidal coupling with the pin portion 10.

In other words, in accordance with an embodiment, the rotor unit 1 comprises an actuator 5 associated with each blade folding structure 4, said actuator 5 having a first connecting portion 8 connected to said rotor body 2 and a second connecting portion 9 connected to a respective blade folding structure 4, for example, the second connecting portion 9 is connected to a respective supporting bracket 6, for example, the second connecting portion 9 is connected to said actuation portion 12 of said supporting bracket 6.

In accordance with an embodiment, each blade folding structure 4 comprises a counter-abutment surface 14 adapted to abut against a lateral abutment surface 13 of said rotor body 2 when said blades 20 are in the open position.

In particular, said at least one actuator 5 is arranged to move said at least two blade folding structures 4 up to forcing said counter-abutment surface 14 against said lateral abutment surface 13 when said blades 20 are in the open position.

In accordance with an embodiment, said at least one actuator 5 comprises at least one linear actuator, for example at least one hydraulic cylinder, or at least one pneumatic cylinder, or at least one actuator with a screw-nut system, for example at least one screw system with recirculating balls.

In accordance with an embodiment, each of said at least two supporting brackets 6 comprises a respective bracket arm 11, which extends for example along a plane which is substantially orthogonal to the hinge axis P, in which said second connecting portion 9 of said actuator means 5 is connected to said actuation portion 12. Said actuation portion 12 is for example a distal end 12 of said bracket arm 11.

In accordance with an embodiment, the counter-abutment surface 14 belongs to said bracket arm 11.

In accordance with an embodiment, the rotor body 2 comprises a projecting portion 7 and the at least one actuator 5 is connected to the projecting portion 7, so that the at least one actuator 5 can pull the blade folding structures 4 close to the projecting portion 7 to bring the blades 20 from the folded position to the open position.

In accordance with an embodiment, the rotor body 2 comprises lateral abutment surfaces 13 and each of said at least two blade folding structures 4 comprises a respective counter-abutment surface 14 adapted to abut against one of said lateral abutment surfaces 13 when said blades 20 are in the open position.

According to a preferred embodiment, the at least two blade folding structures 4 are only two blade folding structures for only two blades 20. In other words, according to a preferred embodiment, the wind turbine 100 comprises only two blades 20.

In accordance with an embodiment, the projecting portion 7 projects along the rotor axial plane L passing through the hinge axis P.

In accordance with an embodiment, the lateral abutment surfaces 13 are opposite side surfaces of said projecting portion 7.

In accordance with an embodiment, said counter-abutment surfaces 14 each belong to a respective supporting bracket 6 and are positioned to abut against said opposite lateral abutment surfaces 13 of said projecting portion 7 when approaching to the projecting portion 7 from opposite sides of said projecting portion 7 in order to bring the blades 20 from the folded position to the open position.

In accordance with an embodiment, said lateral abutment surfaces 13 are substantially parallel to each other and parallel to the rotor axial plane L. In this regard, see FIG. 16.

Alternatively, said lateral abutment surfaces 13 are arranged on axial planes containing the hinge axis P.

In accordance with an embodiment, the projecting portion 7 extends mainly along a projecting portion axis X.

Figure 17:
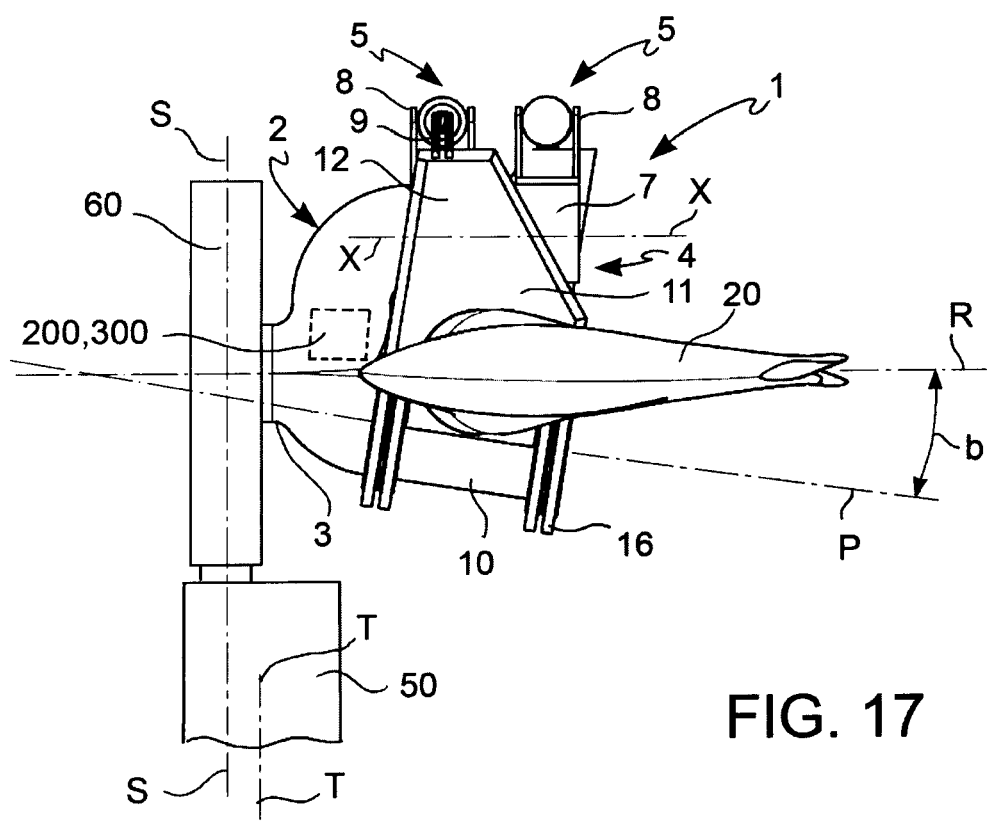
FIG. 17 shows a side view of the rotor unit in FIG. 16, in which the blades are in an open position.

For example, the projecting portion axis X is substantially parallel to the rotor axis R, as shown in FIG. 17, for example.

According to another example, the projecting portion axis X is substantially parallel to the hinge axis P.

In accordance with an embodiment, the projecting portion 7 extends on the opposite side of the rotor axis R with respect to the hinge axis P.

In accordance with an embodiment, the projecting portion axis X, the rotor axis R and the hinge axis P all lie on the rotor axial plane L.

If there are only two blade folding structures 4, or in other words only two blades 20, when the blades 20 are in the open position, the blade longitudinal axes G of the two blades 20 and the rotor axis R lie on a same open blade axial plane W.

Figure 18:
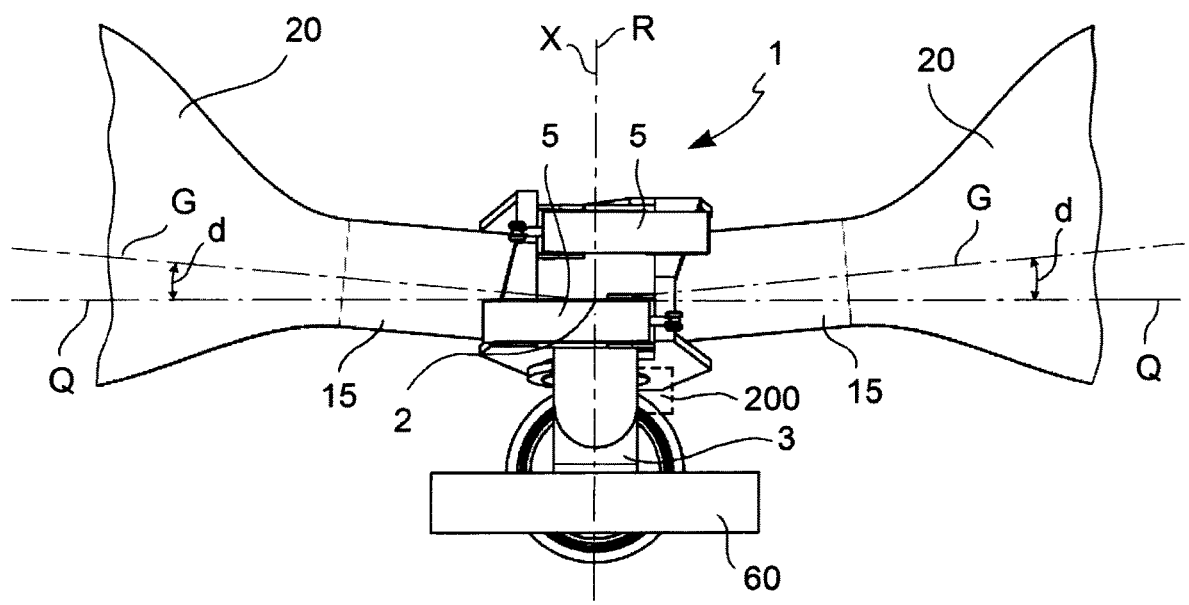
FIG. 18 shows a top view of the rotor unit in FIG. 16, in which the blades are in an open position.
Figure 19:
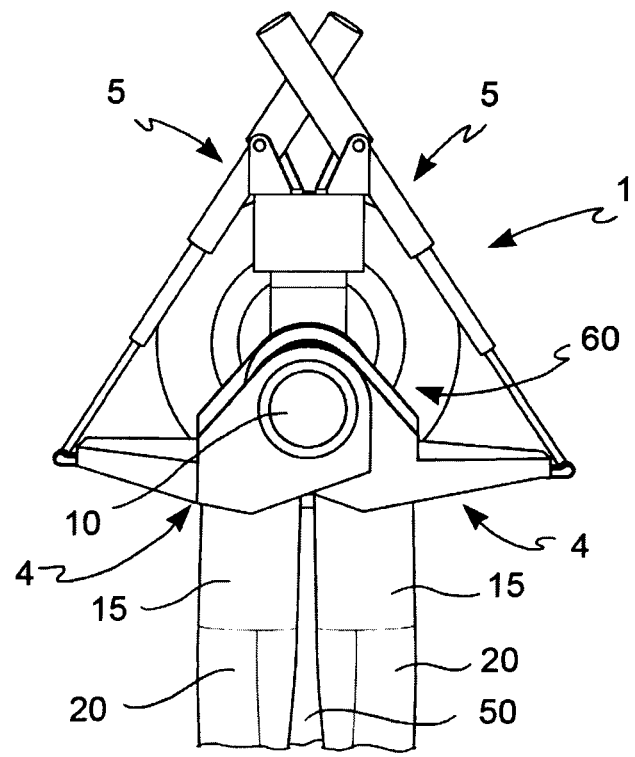
FIG. 19 shows a front view of the rotor unit in FIG. 16, in which the blades are in a folded position.

In accordance with an embodiment, as shown for example in FIG. 18, when the blades 20 are open, the blade longitudinal axis G of both blades 20 intersects the rotor axis R at the same point.

Thereby, the dynamic balancing of the structure is obtained. If the rotor axis R were not lying on the same lying plane as the blade longitudinal axes G, the mass of the blades 20 would generate a highly intense rotational force.

The rotor axial plane L and the open blade axial plane W are orthogonal to each other.

In accordance with an embodiment, for each blade folding structure 4, the rotor unit 1 comprises a blade joint 15 adapted to fasten a blade fastening end 20' to a respective one of said at least two blade folding structures 4, so as to allow only the rotation of blade 20 about the blade longitudinal axis G with respect to the blade folding structure 4. In other words, the blade joint 15 is adapted to carry a respective blade 20, thus preventing any movement of blade 20 with respect to the folding structure 4, other than the rotation of blade 20 about its own blade longitudinal axis G with respect to the blade folding structure 4.

The blade joint 15 comprises a blade orientation actuator 21 for actuating the rotation of blade 20 about the blade longitudinal axis G. The rotation of blade 20 about its own blade longitudinal axis G allows the helical pitch of the wind turbine to be varied.

In accordance with an embodiment, the wind blade joint 15 is substantially cylindrical or tubular in shape, extending along the blade main axis G.

In accordance with an embodiment, the wind blade joint 15 is fastened, or connected, to said supporting bracket 6, for example a proximal end of the wind blade joint 15 is fastened, or connected, to said supporting bracket 6, for example the proximal end of the blade joint is fastened, or connected, to said blade fastening portion 17 of the supporting bracket 6.

Figures from 23 to 33 show a second embodiment of the rotor unit 1 according to the invention.

This embodiment differs from the ones described above in that the at least one actuator 5 is at least a rotary actuator 5.

In accordance with an embodiment, the rotor unit 1 comprises a mechanical transmission for transferring a rotary motion from said, or each, rotary actuator 5 to a corresponding one of said two blade folding structures 4.

The mechanical transmission is for example of the wheel-rack type. For example, such a mechanical transmission comprises a wheel spliced onto a drive shaft 5' of actuator 5, and a circular rack 22 which is integral with the blade folding structure 4 in order to rotate the blade folding structure 4 about the hinge axis P as a function of the rotation of the drive shaft 5'.

In accordance with an embodiment, the circular rack 22 extends for an arc of a circle. For example, for an arc of a circle the angular extension of which is less than the one of a complete circle.

In accordance with an embodiment, the circular rack 22 comprises a radially outward toothing.

In accordance with an embodiment, the circular rack 22 forms a portion of said supporting bracket 6, for example forms said actuation portion 12.

In accordance with an embodiment, the rotary actuator 5 comprises a gear-motor, comprising a rotary motor and a reduction gear.

In accordance with an embodiment, the rotary actuator 5 comprises an electric motor or a hydraulic motor.

In accordance with an embodiment, the rotor unit 1 comprises a folding brake 19 associated with the, or each, actuator 5, or associated with the blade folding structures 4, the folding brake 19 being adapted to oppose the movement of the blade folding structures 4 between the open position and the folded position.

For example, the folding brake 19 is a mechanical brake, for example a disc brake or a drum brake. Alternatively, the folding brake 19 is integrated together with actuator 5 in which the braking action is obtained by controlling the actuation of actuator 5 itself.

In accordance with an embodiment, for example as shown in FIGS. 23, 26, 29, 30, 32, the rotor unit 1 comprises blocking/releasing devices 25 adapted to block/release the at least two blade folding structures 4 with respect to said rotor body 2 when the blade folding structures 4 are in the open position. In other words, such blocking/releasing devices 25 serve to retain the blades 20 in the open position during the rotation of the rotor unit 1 and to ensure this open position is kept during normal use.

According to the example in the aforesaid figures, such blocking/releasing devices 25 are interposed between each blade folding structure 4 and the rotor body 2, for example between each supporting bracket 6 and said rotor body 2, for example between each supporting bracket 6 and said projecting portion 7.

In accordance with an embodiment, such blocking/releasing devices 25 comprise a rotatable hook element mounted on one of the blade folding structure 4 and the rotor body 2, the rotatable hook element being adapted to be engaged with a coupling element which is integral with the other of the blade folding structure and the rotor body 2.

In accordance with one example, as shown in the aforesaid drawings, the hook body is mounted on a corresponding blade fastening portion 17 and the coupling element is fastened to the rotor body 2, for example to the projecting portion 7.

In accordance with an embodiment, the blocking/releasing devices 25 comprise an actuator adapted to actuate said blocking/releasing devices, for example a motorized actuator, for example an automatic motorized actuator.

Although such blocking/releasing devices 25 are depicted with reference to FIGS. 23-32, it is apparent that such blocking/releasing devices 25 may also be applied to the embodiments described above in FIGS. 1-21 without any modifications.

In accordance with an embodiment, the rotor unit 1 comprises the opening/folding control unit 200.

According to another aspect of the invention, there is described, with reference to the accompanying drawings, a folding blade wind turbine 100 comprising a rotor unit 1 as described above.

The wind turbine 100 comprises a tower 50 adapted to support the rotor unit 1, at least two blades 20 connected to the rotor unit 1, an electric generator 60 which can be actuated by the rotation of the rotor unit 1.

The assembly of rotor unit 1, blades 20, electric generator 60 is supported by an upper end of tower 50 in a rotatable manner about a turbine orientation axis S, for example a vertical axis. The rotation of the rotor unit 1 about the turbine orientation axis S is adapted to allow the rotor unit 1 to be orientated according to a direction of the wind and to follow the wind direction variations over time.

Tower 50 defines a tower axis T arranged along a main direction of extension of tower 50.

In accordance with an embodiment, the turbine orientation axis S is parallel to the tower axis T, as shown for example in FIGS. 1 to 21, or the turbine orientation axis S is coincident with the tower axis T, as shown for example in figures from 23 to 32. It is worth noting that these two configurations are perfectly interchangeable with each other without any modifications.

The folding blade wind turbine 100 is, for example, of the horizontal axis type, i.e. the rotor axis R is arranged in substantially horizontal direction, for example orthogonal to the turbine orientation axis S. This type of wind turbine is capable of exploiting currents which circulate parallel to the ground, and therefore is particularly suitable for use in plains or in the sea.

In accordance with an embodiment, the electric generator 60 is of the "direct drive" type. In other words, it comprises an outer annular stator 61 and an inner disc rotor 62, which is adapted to rotate coaxially and internally to the outer annular stator 61.

For example, the outer annular stator 61 is fastened to a supporting portion 51, which is connected to the upper end of tower 50 in a rotatable manner about the turbine orientation axis S.

The inner disc rotor 62 is, for example, spliced onto the rotor body 2 so as to allow the rotation of the rotor body 2 about the rotor axis R.

This type of generator 60 allows the encumbrance of the generator itself 60 to be reduced in the direction which extends along the rotor axis R, or along an axial direction of generator. This allows the distance of the center of gravity of the rotor unit 1 to be reduced with respect to the turbine orientation axis S, and therefore the overhang of the rotor unit 1 to be reduced with respect to tower 50. This aspect is particularly significant in order to give the wind turbine high structural strength, considering the great size and weight of the rotor unit 1. This aspect is highly advantageous also because it allows the overall size, and therefore the aerodynamic resistance of the rotor unit 1, to be reduced.

The rotor unit 1, blades 20, electric generator 60 unit is contained inside a containment shell 52, or nacelle. The shape of the containment shell 52 is designed so as to further reduce the aerodynamic resistance against the action of the wind.

In accordance with an embodiment, the wind turbine 100 is mounted on a floating platform which is adapted to carry the floating tower on a basin of water.

The wind turbine 100 described here is particularly suited for off-shore use, where the wind speed reaches very high values which rapidly change over time.

In accordance with an embodiment, the wind turbine 100 comprises a rotor brake 90 adapted to oppose the rotation of the rotor body 2 about the rotor axis R.

In accordance with an embodiment, the rotor brake 90 is a mechanical brake or an electromagnetic brake.

For example, the rotor brake 90 has a first portion which is integral with the rotor body 2, and a second portion which is stationary with respect to the rotor body 2, for example the second portion is integral with the stator of the electric generator 60.

For example, such a brake is a disc brake, in which, for example, the disc brake has a brake disc 92 keyed onto the rotor body 2 and pincer bodies 91 mounted on the stator of the electric generator 60, which are adapted to force pads against the disc to brake the rotation of the rotor body 2.

In accordance with an embodiment, the wind turbine 100 comprises blade stopping devices 120 which can be actuated between an engaged position, in which the blades 20 are assured to tower 50 in the folded position, and a disengaged position, in which the blades 20 are free to move away from tower 50. The blade stopping devices 120 allow the blades 20 in the folded position to resist the high action of the wind during a storm.

In accordance with an embodiment, the blade stopping devices 120 comprise a hook element 121 associated with one of blade 20 and tower 50, and a coupling seat 122 associated with the other of blade 20 and tower 50, said hook element 121 being operable between an engaged position with the coupling seat 122 and a disengaged position from the coupling seat 122.

In accordance with an embodiment, the blade stopping devices 120 comprise actuators for actuating blade stopping devices 120 between the engaged position and the disengaged position.

In accordance with an embodiment, the folding blade wind turbine 100 comprises a supply unit 300, which in the absence of an external power supply to the wind turbine supplied by the electric network, serves to allow the blades 20 to be folded and the safety measures thereof to be implemented.

In particular, the supply unit 300 serves the purpose of supplying the actuation of the pincer bodies 91 of the rotor brake 90, supplying the blade orientation actuator 21, supplying the actuation of actuator 5, supplying the actuation of the folding brake 19, supplying the actuation of the blade blocking/releasing devices 25, supplying the actuation of the tower blade stopping devices 120 and supplying the operation of the blade opening/folding control unit 200.

In accordance with an embodiment, the supply unit 300 is included in the rotor unit 1, for example is located in the rotor unit 1, for example is located in the containment shell 52, or nacelle.

Alternatively, the supply unit 300 is located in the tower 50, or is arranged remotely with respect to the wind turbine.

In accordance with an embodiment, the supply unit 300 comprises an electric generator, for example a liquid or gaseous fuel electric generator, or a solar energy electric generator.

In accordance with an embodiment, the supply unit 300 comprises a pack of electric batteries.

In accordance with an embodiment, the folding blade wind turbine 100 comprises a blade opening/folding control unit 200, said blade opening/folding control unit 200 having an input for receiving an open/fold command signal, said control unit being operatively connected with said at least one actuator 5 to actuate said at least one actuator 5 as a function of the command signal.

In accordance with an embodiment, the blade opening/folding control unit 200 is operatively connected with said folding brake 19 to control the rotation speed of the blade folding structures 4 between the open position and the folded position and vice versa.

In accordance with an embodiment, the blade opening/folding control unit 200 is operatively connected with the blade orientation actuator 21 of the blade joint 15 to control the rotation of blade 20 about its own blade longitudinal axis G.

In accordance with an embodiment, the blade opening/folding control unit 200 is operatively connected to said blocking/releasing devices 25 to command the blocking of the blade folding structures 4 when they are in the open position and to release the blade folding structures 4 to allow the rotation thereof from the open position to the folded position.

In accordance with an embodiment, the blade opening/folding control unit 200 is operatively connected to the rotor brake 90 to oppose the rotation of the rotor unit 1 about the rotor axis R.

In accordance with an embodiment, the blade opening/folding control unit 200 is operatively connected to the blade stopping devices 120 to block the blades 20 in the position close to tower 50 when they are in the folded position.

In accordance with an embodiment, the blade opening/folding control unit 200 comprises a central processing unit (CPU) and a memory, for example a programmable memory, for executing a preset sequence of steps for actuating the wind turbine to rotate the blades 20 between the open position and the folded position and vice versa.

In accordance with an embodiment, the blade opening/folding control unit 200 is mounted on the rotor unit, or the blade opening/folding control unit 200 is mounted on tower 50.

In accordance with an embodiment, the control unit 200 is included in the rotor unit 1, for example is located in the rotor unit 1, for example is located in the containment shell 52, or nacelle.

Alternatively, the control unit 200 is located in tower 50 or is arranged remotely with respect to the wind turbine.

Although the drawings used to accompany the description depict a wind turbine with only two blades 20, any number of blades can be used provided that all the blades can rotate about a same hinge axis P.

A person skilled in the art may make several changes and adaptations to the above-described embodiments of the device, and substitute elements with other functionallyequivalent ones in order to meet contingent needs, without thereby departing from the scope of the following claims. Each of the features described as belonging to a possible embodiment may be achieved irrespective of the other embodiments described. Various means and materials may be used to perform the different functions described without thereby departing from the scope of the invention. It should be understood that the expressions and terminology used serve a merely descriptive purpose and are therefore non-limiting. Furthermore, it is also worth noting that the term "comprising" does not exclude other elements or steps, the term "a/an" does not exclude a plurality. Furthermore, the drawings are not necessarily to scale; on the contrary, importance is generally given to the illustration of the principles of the present invention.

The invention claimed is:

1. A rotor unit for a folding blade wind turbine, said turbine comprising at least two blades rotatable with respect to each other between an open position and a folded position, wherein, in said open position, said at least two blades are arranged angularly spaced from each other in order to be able to be affected by the wind to bring the rotor body into rotation about a rotor axis, and wherein, in said folded position, said at least two blades are arranged angularly close to each other;
said rotor unit comprising a rotor body arranged to rotate about the rotor axis, said rotor body being connectable to an electric generator in order to generate electric energy by the rotation of the rotor body about said rotor axis, said rotor body comprising at least two blade folding structures, each comprising a blade fastening portion suitable for fastening an end portion of a respective blade of said at least two blades to said at least two blade folding structures;
wherein said at least two blade folding structures are pivotally connected to each other about a single hinge axis.

2. The rotor unit according to claim 1, wherein said at least two blade folding structures are all pivotally connected to the rotor body about said single hinge axis.

3. The rotor unit according to claim 1, wherein the hinge axis is tilted with respect to the rotor axis according to a preset tilt angle.

4. The rotor unit according to claim 1, wherein each of said at least two blades defines a respective blade longitudinal axis arranged along a main direction of blade extension, wherein, when the blades are in the open position, the blade longitudinal axes of the blades intersect the rotor axis at a same point.

5. The rotor unit according to claim 1, wherein the hinge axis and the rotor axis define a common rotor axial plane comprising the hinge axis and the rotor axis.

6. The rotor unit according to claim 5, wherein, when the blade folding structures are in the folded position, the projection of the blade longitudinal axis on the rotor axial plane forms a preset blade angle with respect to the hinge axis.

7. The rotor unit according to claim 1, comprising at least one actuator arranged to rotate said at least two blade folding structures with respect to each other about said hinge axis.

8. The rotor unit according to claim 7, comprising a projecting portion to which each actuator is connected so that said actuator can pull the blade folding structures close to the projecting portion to bring the blades from the folded position to the open position.

9. The rotor unit according to claim 8, wherein the projecting portion defines a projecting portion axis along which the projecting portion mainly extends, wherein the projecting portion axis, the rotor axis and the hinge axis all lie on the rotor axial plane.

10. The rotor unit according to claim 1, wherein each blade folding structure is associated with a respective actuator, wherein said respective actuator has a first connecting portion connected to said rotor body and a second connecting portion connected to said blade folding structure.

11. The rotor unit according to claim 1, comprising blocking/releasing devices adapted to block/release the at least two blade folding structures with respect to said rotor body, when the blade folding structures are in the open position.

12. The rotor unit according to claim 1, comprising, for each blade folding structure, a blade joint adapted to connect a blade fastening end to a respective one of said at least two blade folding structures, said blade joint comprising a blade orientation actuator adapted to actuate only the rotation of the blade about the blade longitudinal axis.

13. The rotor unit according to claim 1, wherein the at least two blade folding structures are only two blade folding structures for only two blades.

14. The rotor unit according to claim 13, wherein, when the blades are in the open position, the blade longitudinal axes and the rotor axis lie on a same open blade axial plane, and wherein the rotor axial plane and the open blade axial plane are orthogonal to each other.

15. The rotor unit according to claim 1, comprising a rotor brake adapted to affect and/or stop the rotation of the rotor body about the rotor axis.

16. A folding blade wind turbine comprising:
a rotor unit according to claim 1, comprising a rotor body arranged to rotate about a rotor axis and comprising two blade folding structures, each comprising a blade fastening portion for fastening an end portion of a respective blade of said at least two blades to said at least two blade folding structures; wherein said at least two blade folding structures are pivotally connected to each other about a single hinge axis;
a tower adapted to support said wind turbine rotor unit;
an electric generator connected to said rotor body to generate electric energy by the rotation of the rotor body about said rotor axis;
at least two blades, each blade being connected to a respective blade folding structure of the rotor unit, so that said at least two blades are rotatable with respect to each other between an open position and a folded position, wherein, in said open position, said at least two blades are angularly spaced from each other in order to be able to be affected by the wind to bring the rotor body into rotation about the rotor axis, and wherein, in said folded position, said at least two blades are arranged angularly close to each other.

17. The wind turbine according to claim 16, comprising a control unit having an input for receiving an open/fold command signal, said control unit being operatively connected to, and adapted to control as a function of said command signal, at least one of:
said rotor brake;
said blade orientation actuator;
said at least one actuator;
said folding brake;
said blade blocking/releasing devices;
said electric generator.

18. The wind turbine according to claim 17, comprising blade stopping devices adapted to secure the blades to the tower when said blades are in the folded position to resist the action of the wind.

19. The wind turbine according to claim 18, wherein said control unit is operatively connected with the blade stopping device to enable/disable said blade stopping devices.

20. The wind turbine according to claim 16, comprising a power supply unit adapted to supply the electrical devices of said rotor unit for folding the blades and for implementing safety measures thereof, in absence of external power from a power distribution network.

\* \* \* \* \*